(12) United States Patent
Gross

(10) Patent No.: US 9,975,803 B2
(45) Date of Patent: May 22, 2018

(54) ION EXCHANGEABLE GLASS ARTICLE FOR THREE-DIMENSIONAL FORMING

(71) Applicant: Corning Incorporated, Corning, NY (US)

(72) Inventor: Timothy Michael Gross, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days. days.

(21) Appl. No.: 14/629,966

(22) Filed: Feb. 24, 2015

(65) Prior Publication Data
US 2015/0239770 A1    Aug. 27, 2015

Related U.S. Application Data

(60) Provisional application No. 61/945,430, filed on Feb. 27, 2014.

(51) Int. Cl.
C03C 3/097    (2006.01)
C03C 21/00    (2006.01)

(52) U.S. Cl.
CPC ............ *C03C 3/097* (2013.01); *C03C 21/002* (2013.01); *Y10T 428/315* (2015.01)

(58) Field of Classification Search
None
See application file for complete search history.

(56) References Cited

U.S. PATENT DOCUMENTS

| | | | |
|---|---|---|---|
| 3,287,201 A | 11/1966 | Chisholm et al. | |
| 3,357,876 A | 12/1967 | Rinehart | |
| 3,433,611 A * | 3/1969 | Kubichan | C03C 21/002 501/63 |
| 3,485,647 A * | 12/1969 | Harrington | C03C 3/083 501/63 |
| 3,495,963 A * | 2/1970 | Buckley | C03C 21/005 428/410 |
| 4,055,703 A * | 10/1977 | Rinehart | C03C 3/062 428/218 |
| 2010/0035745 A1 | 2/2010 | Murata | |
| 2011/0281072 A1 | 11/2011 | Sabia et al. | 428/156 |
| 2011/0294648 A1 | 12/2011 | Chapman et al. | |
| 2012/0135226 A1 | 5/2012 | Bookbinder et al. | |
| 2012/0308827 A1 | 12/2012 | Boek et al. | |

(Continued)

FOREIGN PATENT DOCUMENTS

JP    2011057504    3/2011

OTHER PUBLICATIONS

Johnson, et al., Essential Laboratory Mathamatics, 2nd Edition, 2003, p. 30.*

(Continued)

*Primary Examiner* — David Sample
(74) *Attorney, Agent, or Firm* — Kevin M. Johnson

(57) ABSTRACT

An alkali aluminosilicate glass that can be chemically strengthened and formed into a three dimensional shape. The glass has a softening point of less than about 825° C. and a high temperature coefficient of thermal expansion of less than about 30 parts per million (ppm)/° C. The glass may be ion exchanged after the three dimensional shape is formed. When ion exchanged, the glass has a surface layer that is under a compressive stress of at least about 700 MPa.

33 Claims, 3 Drawing Sheets

(56) References Cited

U.S. PATENT DOCUMENTS

| | | | |
|---|---|---|---|
| 2013/0258569 A1 | 10/2013 | Amin et al. | 361/679.01 |
| 2014/0023865 A1 | 1/2014 | Comte et al. | |
| 2014/0050911 A1* | 2/2014 | Mauro | C03C 3/087 428/220 |
| 2014/0170380 A1 | 6/2014 | Murata et al. | |

OTHER PUBLICATIONS

PCT/US2015/017017 Search Report dated July 2, 2015.
Bartholomew, R.F. and H.M. Garfinkel, "Chemical Strengthening of Glass," Glass Science and Technology, eds., D.R. Uhlmann and N.J.Kreidl, vol. 5. Academic Press, New York, 217-267, 1980.

* cited by examiner

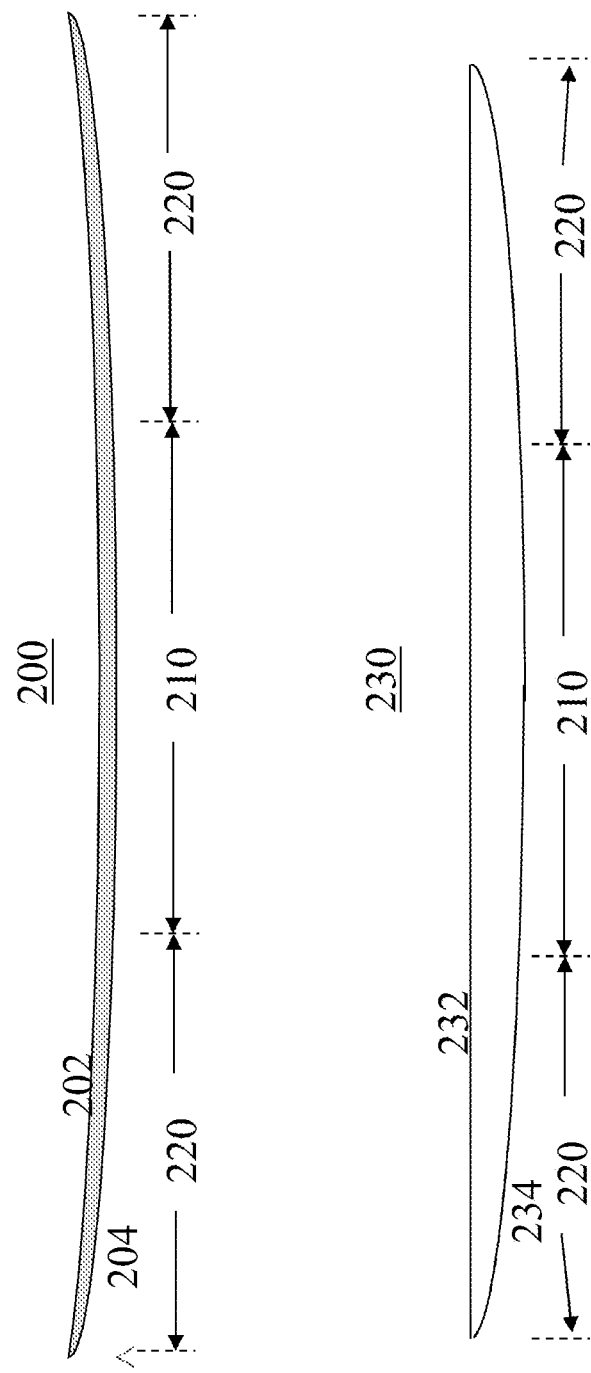

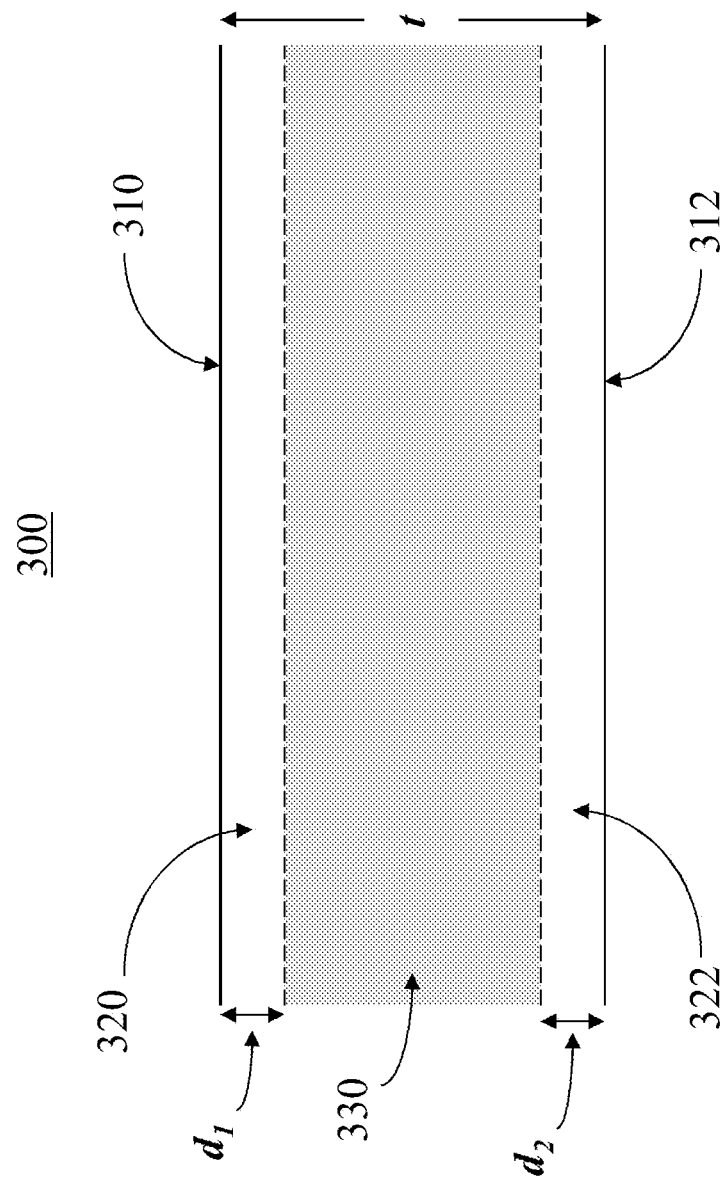

US 9,975,803 B2

ION EXCHANGEABLE GLASS ARTICLE FOR THREE-DIMENSIONAL FORMING

This application claims the benefit of priority under 35 U.S.C. § 119 of U.S. Provisional Application Ser. No. 61/945,430, filed on Feb. 27, 2014, the content of which is relied upon and incorporated herein by reference in its entirety.

BACKGROUND

The disclosure relates to a glass that is formable into three dimensional shapes. More particularly, the disclosure relates to an ion exchanged glass that is formable into three dimensional shapes. Even more particularly, the disclosure relates to such glasses having a low softening point.

Shaped glass articles are entering use as outer covers or enclosure elements in consumer electronics such as mobile phones and tablets. Currently, these articles are made by molding the glass.

SUMMARY

The present disclosure meets these and other needs by providing an alkali aluminosilicate glass that can be chemically strengthened and formed into a three dimensional shape. The glass has a softening point of less than about 825° C. and a high temperature coefficient of thermal expansion of less than about 30 parts per million (ppm)/° C. The glass may be ion exchanged after the three dimensional shape is formed. When ion exchanged, the glass has a surface layer that is under a compressive stress of at least about 700 MPa.

Accordingly, one aspect of the disclosure is to provide a glass article comprising at least about 50 mol % $SiO_2$, at least about 8 mol % $Al_2O_3$, at least about 1 mol % $P_2O_5$, and at least about 12 mol % $Na_2O$. The glass article is ion exchangeable and has a softening point of less than or equal to about 825° C., and a high temperature coefficient of thermal expansion of less than or equal to 30 ppm/° C.

A second aspect of the disclosure is to provide a glass article comprising at least about 50 mol % $SiO_2$, at least about 8 mol % $Al_2O_3$, at least about 1 mol % $P_2O_5$, and at least about 12 mol % $Na_2O$. The glass article is ion exchanged and has a compressive layer extending from a surface of the glass article to a depth of layer within the article, wherein the compressive layer has a maximum compressive stress of at least about 700 MPa. The glass article has a softening point of less than or equal to about 825° C. and a high temperature coefficient of thermal expansion of less than or equal to 29 ppm/° C.

These and other aspects, advantages, and salient features will become apparent from the following detailed description, the accompanying drawings, and the appended claims.

BRIEF DESCRIPTION OF THE DRAWINGS

FIG. 2 is a cross-sectional schematic view of dish-shaped glass articles; and

FIG. 3 is a cross-sectional schematic view of a planar ion exchanged glass article.

DETAILED DESCRIPTION

Figure 1:
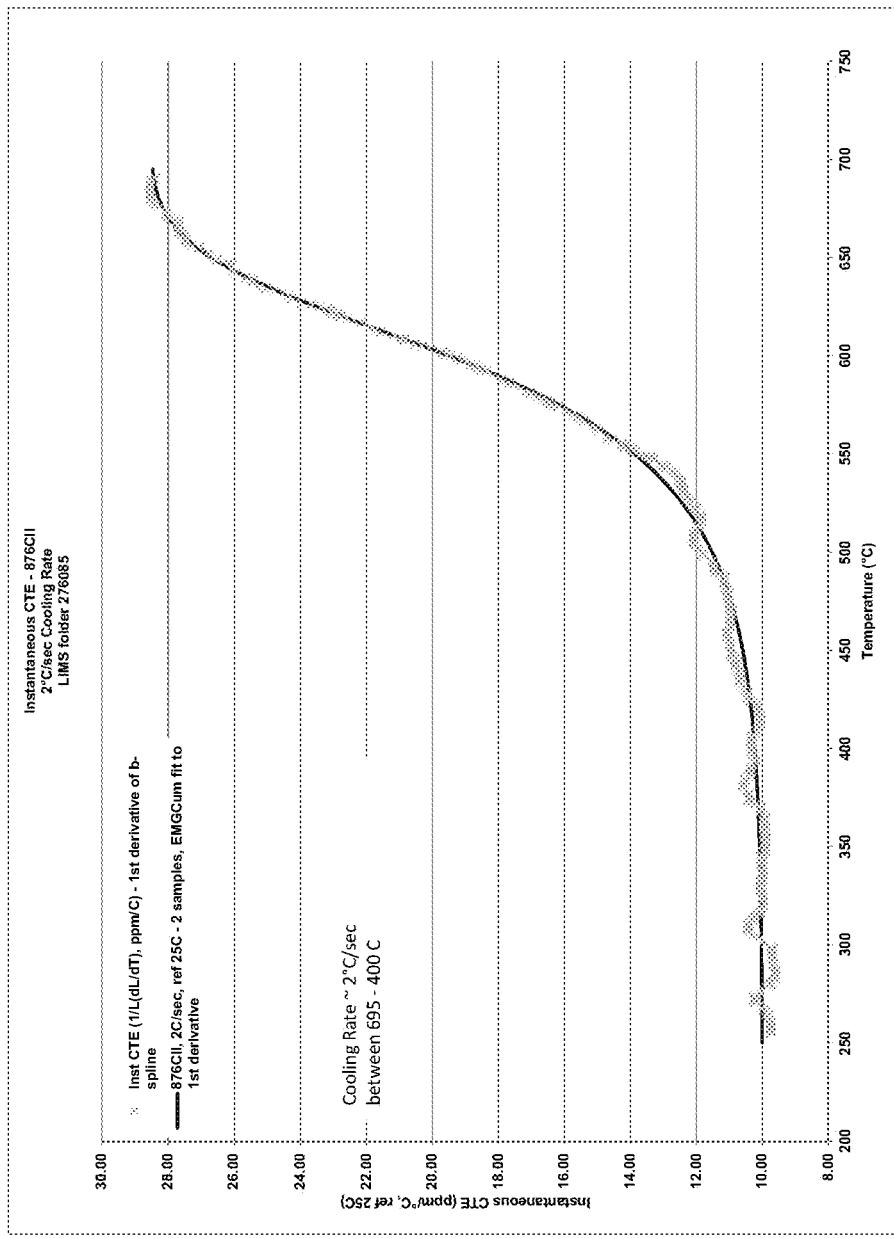
FIG. 1 is a plot of instantaneous coefficient of thermal expansion as a function of temperature for sample 20 in Table 1.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). High temperature coefficients of thermal expansion (high temperature CTE) are expressed in terms of part per million (ppm) per degree Celsius (ppm/° C.), and represent a value measured in the high temperature plateau region of the instantaneous CTE vs. temperature curve.

Unless otherwise specified, all temperatures are expressed in terms of degrees Celsius (° C.). As used herein the term "softening point" refers to the temperature at which the viscosity of a glass is approximately $10^{7.6}$ poise (P), the term "anneal point" refers to the temperature at which the viscosity of a glass is approximately $10^{13.2}$ poise, the term "200 poise temperature ($T^{200P}$)" refers to the temperature at which the viscosity of a glass is approximately 200 poise, the term "1 poise temperature ($T^{200P}$)" refers to the temperature at which the viscosity of a glass is approximately 200 poise, the term "$10^{11}$ poise temperature" refers to the temperature at which the viscosity of a glass is approximately $10^{11}$ poise, the term "35 kP temperature ($T^{35kP}$)" refers to the temperature at which the viscosity of a glass is approximately 35 kilopoise (kP), and the term "160 kP temperature ($T^{160kP}$)" refers to the temperature at which the viscosity of a glass is approximately 160 kP.

As used herein, the term "zircon breakdown temperature" or "$T^{breakdown}$" refers to the temperature at which zircon—which is commonly used as a refractory material in glass processing and manufacture—breaks down to form zirconia and silica, and the term "zircon breakdown viscosity" refers to the viscosity of the glass at $T^{breakdown}$. The term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of lithium," for example is one in which lithium and compounds formed by lithium is not actively added or batched into the glass, but may be present in very small amounts as a contaminant.

Vickers crack initiation thresholds described herein are determined by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

As used herein, "maximum compressive stress" refers to the highest compressive stress value measured within the compressive layer. In some embodiments, the maximum compressive stress is located at the surface of the glass and may appear as a "spike" in the compressive stress profile. In other embodiments, the maximum compressive stress may occur at a depth below the surface, giving the compressive profile the appearance of a "buried peak." Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass and expressed in nm/mm/MPa. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

As used herein, the term "three dimensional shape" refers to a shape or form other than a flat sheet. The three dimensional shape does not lie in a plane. Non-limiting examples of three dimensional glass articles are shown in FIG. 2. Dish-shaped article 200 has two major surfaces 202, 204 each of which has a substantially flat or planar portion 210, bounded on either end (or, alternatively, on both ends) by a curved portion 220 to provide a dish-shaped profile or appearance. In other embodiments, dish-shaped article 230 has only one major surface 234 having a substantially flat or planar portion 210, bounded on either end (or, alternatively, on both ends) by a curved portion 220. The remaining major surface 232 is substantially flat or planar.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

In order for a glass to be formable into a three dimensional shape for use a cover glass in hand held electronic devices, the glass should have a low softening point to facilitate shaping and a sufficiently low coefficient of thermal expansion (CTE) at high temperature to prevent cracking. In addition, the glass should be ion exchangeable to achieve a surface compressive stress that is sufficient to prevent damage due to impact.

Described herein is a family of glasses that are fusion formable, ion exchangeable, and formable into three dimensional shapes. The glass comprises at least about 50 mol % $SiO_2$; at least about 8 mol % $Al_2O_3$; at least about 1 mol % $P_2O_5$; and at least about 12 mol % $Na_2O$, and has a softening point of less than or equal to about 825° C. and a high temperature coefficient of thermal expansion (high temperature CTE) of less than or equal to about 30 ppm/° C. In some embodiments, the softening point of the glasses described herein is less than or equal to about 800° C. and, in still other embodiments, less than or equal to about 775° C.

As previously mentioned, the high temperature coefficient of thermal expansion is taken as the instantaneous coefficient of thermal expansion of the glass at high temperatures. FIG. 1 is a plot of instantaneous coefficient of thermal expansion as a function of temperature for sample 20 in Table 1. The high temperature CTE of this glass sample is the instantaneous CTE at the high temperature plateau occurring at about 675° C. In some embodiments, the high temperature coefficient of thermal expansion is less than or equal to about 29 ppm/° C. and, in other embodiments, less than or equal to about 27 ppm/° C. Exemplary compositions of these glasses are listed in Table 1. Softening points, high temperature coefficients of thermal expansion, and other physical properties of the glasses listed in Table 1, including strain points, anneal points, $T^{200P}$, $10^{11}$ poise temperature, $T^{35kP}$, $T^{breakdown}$, zircon breakdown viscosity, $T^{160kP}$ liquidus temperature, liquidus viscosity, refractive index, and SOC, are listed in Table 2.

TABLE 1

Compositions of glasses.

| Analyzed Composition (mol %) | 1 | 2 | 3 | 4 | 5 | 6 |
|---|---|---|---|---|---|---|
| $SiO_2$ | 58.30 | 58.48 | 58.41 | 58.71 | 59.06 | 59.01 |
| $Al_2O_3$ | 15.60 | 14.45 | 13.56 | 12.64 | 11.74 | 10.69 |
| $P_2O_5$ | 4.76 | 4.76 | 4.82 | 4.74 | 4.67 | 4.68 |
| $B_2O_3$ | 5.05 | 5.14 | 5.16 | 4.92 | 4.79 | 4.81 |
| $Na_2O$ | 13.31 | 14.27 | 15.17 | 16.08 | 16.73 | 17.85 |
| ZnO | 2.98 | 2.90 | 2.88 | 2.92 | 3.00 | 2.96 |
| $SnO_2$ | 0.00 | 0.00 | 0.00 | 0.00 | 0.00 | 0.00 |

TABLE 1-continued

Compositions of glasses.

| | | | | | | |
|---|---|---|---|---|---|---|
| $(R_2O + RO + B_2O_3)/(Al_2O_3 + P_2O_5 + SiO_2)$ | 0.27 | 0.29 | 0.30 | 0.31 | 0.33 | 0.34 |

| Analyzed Composition (mol %) | 7 | 8 | 9 | 10 | 11 | 12 |
|---|---|---|---|---|---|---|
| $SiO_2$ | 57.73 | 57.88 | 57.91 | 57.82 | 58.19 | 58.27 |
| $Al_2O_3$ | 15.51 | 14.52 | 13.63 | 12.61 | 11.71 | 10.71 |
| $P_2O_5$ | 4.87 | 4.81 | 4.77 | 4.88 | 4.75 | 4.88 |
| $B_2O_3$ | 4.97 | 4.92 | 4.89 | 4.82 | 4.53 | 4.49 |
| $Na_2O$ | 13.09 | 14.06 | 14.90 | 15.95 | 16.92 | 17.66 |
| ZnO | 3.82 | 3.80 | 3.90 | 3.93 | 3.90 | 3.99 |
| $SnO_2$ | 0.00 | 0.00 | 0.00 | 0.00 | 0.00 | 0.00 |
| $(R_2O + RO + B_2O_3)/(Al_2O_3 + P_2O_5 + SiO_2)$ | 0.28 | 0.30 | 0.31 | 0.33 | 0.34 | 0.35 |

| Analyzed Composition (mol %) | 13 | 14 | 15 | 16 | 17 | 18 |
|---|---|---|---|---|---|---|
| $SiO_2$ | 56.52 | 55.11 | 56.69 | 56.69 | 57.11 | 57.36 |
| $Al_2O_3$ | 15.49 | 14.52 | 13.53 | 12.55 | 11.62 | 10.70 |
| $P_2O_5$ | 4.83 | 4.88 | 4.81 | 4.78 | 4.72 | 4.70 |
| $B_2O_3$ | 5.00 | 5.08 | 4.87 | 4.90 | 4.63 | 4.47 |
| $Na_2O$ | 13.08 | 14.35 | 14.93 | 15.91 | 16.80 | 17.62 |
| ZnO | 5.09 | 6.05 | 5.16 | 5.17 | 5.12 | 5.15 |
| $SnO_2$ | 0.00 | 0.00 | 0.00 | 0.00 | 0.00 | 0.00 |
| $(R_2O + RO + B_2O_3)/(Al_2O_3 + P_2O_5 + SiO_2)$ | 0.30 | 0.34 | 0.33 | 0.35 | 0.36 | 0.37 |

| Analyzed Composition (mol %) | 19 | 20 | 21 | 22 | 23 | 24 |
|---|---|---|---|---|---|---|
| $SiO_2$ | 58.31 | 56.68 | 58.64 | 57.51 | 57.69 | 53.73 |
| $Al_2O_3$ | 12.68 | 12.53 | 12.50 | 12.49 | 12.76 | 14.52 |
| $P_2O_5$ | 4.70 | 4.87 | 4.87 | 4.88 | 4.72 | 4.93 |
| $B_2O_3$ | 4.69 | 4.93 | 5.03 | 5.12 | 4.47 | 5.04 |
| $Na_2O$ | 16.72 | 18.12 | 17.02 | 18.03 | 18.48 | 17.89 |
| ZnO | 2.90 | 2.87 | 1.95 | 1.97 | 1.88 | 3.88 |
| $SnO_2$ | 0.00 | 0.00 | 0.00 | 0.00 | 0.00 | 0.00 |
| $(R_2O + RO + B_2O_3)/(Al_2O_3 + P_2O_5 + SiO_2)$ | 0.32 | 0.35 | 0.32 | 0.34 | 0.33 | 0.37 |

| Analyzed Composition (mol %) | 25 | 26 | 27 | 28 | 29 | 30 |
|---|---|---|---|---|---|---|
| $SiO_2$ | 53.61 | 53.61 | 54.12 | 54.08 | 54.93 | 56.37 |
| $Al_2O_3$ | 14.50 | 14.42 | 14.71 | 14.58 | 14.73 | 12.59 |
| $P_2O_5$ | 3.95 | 5.87 | 2.95 | 6.66 | 4.75 | 5.04 |
| $B_2O_3$ | 6.01 | 4.06 | 6.64 | 3.05 | 4.53 | 5.01 |
| $Na_2O$ | 17.93 | 17.96 | 17.61 | 17.81 | 17.64 | 19.09 |
| ZnO | 4.00 | 4.08 | 3.97 | 3.83 | 3.43 | 1.90 |
| $SnO_2$ | 0.00 | 0.00 | 0.00 | 0.00 | 0.00 | 0.00 |
| $(R_2O + RO + B_2O_3)/(Al_2O_3 + P_2O_5 + SiO_2)$ | 0.39 | 0.35 | 0.39 | 0.33 | 0.34 | 0.35 |

| Analyzed Composition (mol %) | 31 | 32 | 33 | 34 | 35 | 36 |
|---|---|---|---|---|---|---|
| $SiO_2$ | 56.21 | 56.89 | 56.06 | 56.80 | 57.04 | 53.13 |
| $Al_2O_3$ | 12.58 | 12.73 | 12.53 | 12.35 | 12.85 | 15.15 |
| $P_2O_5$ | 5.98 | 4.01 | 7.14 | 2.88 | 2.08 | 2.92 |
| $B_2O_3$ | 4.02 | 5.49 | 2.94 | 6.73 | 7.24 | 6.51 |
| $Na_2O$ | 19.31 | 18.93 | 19.41 | 19.29 | 18.72 | 18.84 |
| ZnO | 1.90 | 1.95 | 1.92 | 1.95 | 2.07 | 3.46 |
| $SnO_2$ | 0.00 | 0.00 | 0.00 | 0.00 | 0.00 | 0.00 |
| $(R_2O + RO + B_2O_3)/(Al_2O_3 + P_2O_5 + SiO_2)$ | 0.34 | 0.36 | 0.32 | 0.39 | 0.39 | 0.40 |

TABLE 1-continued

Compositions of glasses.

| Analyzed Composition (mol %) | 37 | 38 | 39 | 40 | 41 | 42 |
|---|---|---|---|---|---|---|
| $SiO_2$ | 53.02 | 52.76 | 52.98 | 52.69 | 53.86 | 54.33 |
| $Al_2O_3$ | 15.13 | 15.21 | 15.29 | 15.76 | 15.22 | 14.99 |
| $P_2O_5$ | 2.92 | 2.94 | 2.94 | 3.00 | 2.06 | 2.08 |
| $B_2O_3$ | 6.61 | 6.32 | 6.29 | 6.39 | 7.49 | 7.41 |
| $Na_2O$ | 18.37 | 18.83 | 19.10 | 18.79 | 17.66 | 16.95 |
| ZnO | 3.94 | 3.94 | 3.40 | 3.37 | 3.71 | 4.23 |
| $SnO_2$ | 0.00 | 0.00 | 0.00 | 0.00 | 0.00 | 0.00 |
| $(R_2O + RO + B_2O_3)/(Al_2O_3 + P_2O_5 + SiO_2)$ | 0.41 | 0.41 | 0.40 | 0.40 | 0.41 | 0.40 |

| Analyzed Composition (mol %) | 43 | 44 | 45 | 46 | 47 | 48 | 49 |
|---|---|---|---|---|---|---|---|
| $SiO_2$ | 54.15 | 53.96 | 53.93 | 54.07 | 53.98 | 53.93 | 53.91 |
| $Al_2O_3$ | 15.47 | 14.59 | 15.19 | 14.52 | 14.74 | 14.69 | 14.80 |
| $P_2O_5$ | 1.58 | 2.43 | 2.44 | 1.45 | 2.49 | 2.47 | 2.45 |
| $B_2O_3$ | 7.78 | 7.24 | 7.17 | 8.18 | 7.21 | 7.27 | 7.08 |
| $Na_2O$ | 17.27 | 17.88 | 17.81 | 17.83 | 17.56 | 17.67 | 17.73 |
| ZnO | 3.75 | 3.89 | 3.46 | 3.95 | 4.02 | 3.97 | 3.89 |
| $SnO_2$ | 0.00 | 0.00 | 0.00 | 0.00 | 0.00 | 0.00 | 0.14 |
| $(R_2O + RO + B_2O_3)/(Al_2O_3 + P_2O_5 + SiO_2)$ | 0.40 | 0.41 | 0.40 | 0.43 | 0.40 | 0.41 | 0.40 |

TABLE 2

Physical properties of the glasses listed in Table 1.

| Sample | 1 | 2 | 3 | 4 | 5 | 6 |
|---|---|---|---|---|---|---|
| Softening Point | 882.1 | 841.5 | 821.9 | 805.2 | 805.7 | 808.6 |
| CTE | 19.38 | 22.34 | 24 | 27 | 27 | 27.22 |
| Strain Point | 559 | 528 | 521 | 520 | 524 | 524 |
| Anneal Point | 614 | 579 | 568 | 562 | 562 | 563 |
| $T^{200P}$ | 1620 | 1601 | 1584 | 1557 | 1532 | 1487 |
| $10^{11}$ P Temperature | 705 | 666 | 650 | 638 | 633 | 636 |
| $T^{35k-P}$ | 1184 | 1156 | 1131 | 1097 | 1070 | 1033 |
| $T^{breakdown}$ | | | | >1290 | | |
| Zircon Breakdown Viscosity (P) | | | | <2528 | | |
| $T^{160kP}$ | 1099 | 1069 | 1044 | 1011 | 985 | 951 |
| Liquidus Temperature | | | | 870 | | |
| Liquidus Viscosity (P) | | | | $3.74 \times 10^6$ | | |
| Refractive Index | 1.4949 | 1.4956 | 1.4957 | 1.4969 | 1.4966 | 1.4957 |
| SOC | 3.472 | 3.436 | 3.434 | 3.341 | 3.319 | 3.282 |

| Sample | 7 | 8 | 9 | 10 | 11 | 12 |
|---|---|---|---|---|---|---|
| Softening Point | 854.2 | 847.6 | 815.8 | 810.8 | 817.5 | 815.7 |
| CTE | 20.6 | 22.1 | 22.2 | 25.8 | 27.9 | 25.5 |
| Strain Point | 541 | 532 | | 522 | 532 | 528 |
| Anneal Point | 595 | 583 | | 565 | 571 | 569 |
| $T^{200P}$ | 1593 | 1582 | 1570 | 1547 | 1515 | 1485 |
| $10^{11}$ P Temperature | 685 | 671 | | 642 | 644 | 644 |
| $T^{35kP}$ | 1165 | 1146 | 1128 | 1094 | 1066 | 1037 |
| $T^{breakdown}$ | | | | | | |
| Zircon Breakdown Viscosity (P) | | | | | | |
| $T^{160kP}$ | 1081 | 1060 | 1041 | 1009 | 982 | 955 |
| Liquidus Temperature | | | | | | |
| Liquidus Viscosity (P) | | | | | | |

TABLE 2-continued

Physical properties of the glasses listed in Table 1.

| Refractive Index | 1.497 | 1.4971 | 1.4973 | 1.499 | 1.4985 | 1.496 |
|---|---|---|---|---|---|---|
| SOC | 3.482 | 3.505 | 3.504 | 3.442 | 3.354 | 3.337 |

| Sample | 13 | 14 | 15 | 16 | 17 | 18 |
|---|---|---|---|---|---|---|
| Softening Point | 843.8 | 832.6 | 813.8 | 834.6 | 819.9 | 821 |
| CTE | 20.7 | 21.44 | 21.9 | 24.25 | 28.14 | 26.33 |
| Strain Point | 545 | 530 | 520 | 535 | 536 | 535 |
| Anneal Point | 595 | 579 | 566 | 575 | 577 | 576 |
| $T^{200P}$ | 1558 | 1565 | 1541 | 1517 | 1495 | 1461 |
| $10^{11}$ P Temperature | 679 | 663 | 646 | 650 | 651 | 651 |
| $T^{35kP}$ | 1142 | 1131 | 1109 | 1078 | 1057 | 1025 |
| $T^{breakdown}$ Zircon Breakdown Viscosity (P) | | | | | | |
| $T^{160kP}$ Liquidus Temperature | 1059 | 1047 | 1024 | 995 | 976 | 945 |
| Liquidus Viscosity (P) | | | | | | |
| Refractive Index | | | | | | |
| SOC | 3.494 | 3.486 | 3.497 | 3.467 | 3.408 | 3.349 |

| Sample | 19 | 20 | 21 | 22 | 23 | 24 |
|---|---|---|---|---|---|---|
| Softening Point | 798.1 | 779.2 | 780.7 | 771.3 | 766.4 | 786.4 |
| CTE | 29 | 29 | 29 | 28 | 27 | 27.2 |
| Strain Point | 524 | 514 | 513 | 513 | 512 | 515 |
| Anneal Point | 566 | 554 | 557 | 555 | 553 | 558 |
| $T^{200P}$ | 1543 | 1500 | 1546 | 1514 | 1504 | 1492 |
| $10^{11}$ P Temperature | 640 | 625 | 632 | 627 | 624 | 633 |
| $T^{35kP}$ | 1094 | 1055 | 1085 | 1057 | 1052 | 1067 |
| $T^{breakdown}$ Zircon Breakdown Viscosity (P) | | | | | | |
| $T^{160kP}$ Liquidus Temperature | 1007 | 971 | 997 | 972 | 968 | 986 |
| Liquidus Viscosity (P) | | | | | | |
| Refractive Index | | | 1.4958 | 1.4965 | 1.4968 | 1.5018 |
| SOC | 3.321 | 3.327 | 3.252 | 3.246 | 3.234 | 3.349 |

| Sample | 25 | 26 | 27 | 28 | 29 | 30 |
|---|---|---|---|---|---|---|
| Softening Point | 777.9 | 792.6 | 770.4 | 799.5 | 803.1 | 759.9 |
| CTE | 27.3 | 26 | 28.56 | 26 | 25.4 | 29.15 |
| Strain Point | 514 | 519 | 516 | 518 | 527 | 509 |
| Anneal Point | 557 | 562 | 559 | 563 | 572 | 549 |
| $T^{200P}$ | 1483 | 1513 | 1480 | 1522 | 1517 | 1488 |
| $10^{11}$ P Temperature | 631 | 637 | 631 | 641 | 649 | 618 |
| $T^{35kP}$ | 1056 | 1086 | 1054 | 1093 | 1089 | 1038 |
| $T^{breakdown}$ Zircon Breakdown Viscosity (P) | | | 1110 14008 | | | |
| $T^{160kP}$ Liquidus Temperature | 976 | 1003 | 974 820 | 1011 | 1006 | 955 |
| Liquidus Viscosity (P) | | | $7.09 \times 10^6$ | | | |
| Refractive Index | 1.5037 | 1.5003 | 1.5056 | 1.4989 | 1.5001 | 1.49642 |
| SOC | 3.407 | 3.321 | 3.369 | 3.249 | 3.393 | 3.206 |

TABLE 2-continued

Physical properties of the glasses listed in Table 1.

| Sample | 31 | 32 | 33 | 34 | 35 | 36 |
|---|---|---|---|---|---|---|
| Softening Point | 771.5 | 751.4 | 773.4 | 737 | 738.6 | 770.7 |
| CTE | 27.51 | 30.9 | 28.6 | 34.29 | 35.2 | 29.61 |
| Strain Point | 510 | 515 | 506 | 516 | 518 | 522 |
| Anneal Point | 551 | 556 | 548 | 555 | 558 | 564 |
| $T^{200P}$ | 1496 | 1480 | 1512 | 1447 | 1465 | 1465 |
| $10^{11}$ P Temperature | 623 | 624 | 621 | 619 | 622 | 634 |
| $T^{35kP}$ | 1048 | 1029 | 1066 | 999 | 1008 | 1048 |
| $T^{breakdown}$ Zircon Breakdown Viscosity (P) | | | | | | |
| $T^{160kP}$ | 965 | 946 | 982 | 919 | 928 | 969 |
| Liquidus Temperature | | | | | | |
| Liquidus Viscosity (P) | | | | | | |
| Refractive Index | 1.49431 | 1.49889 | 1.49445 | 1.50233 | 1.50475 | 1.5044 |
| SOC | 3.124 | 3.181 | 3.077 | 3.172 | 3.217 | 3.388 |

| Sample | 37 | 38 | 39 | 40 | 41 | 42 |
|---|---|---|---|---|---|---|
| Softening Point | 770.2 | 765.6 | 773.3 | 785.3 | 772.3 | 769 |
| CTE | 29.62 | 28.92 | 29.75 | 28.26 | 28.27 | 29.42 |
| Strain Point | 521 | 522 | 524 | 523 | 517 | 509 |
| Anneal Point | 563 | 563 | 567 | 566 | 561 | 551 |
| $T^{200P}$ | 1465 | 1450 | 1468 | 1477 | 1468 | 1456 |
| $10^{11}$ P Temperature | 634 | 632 | 638 | 639 | 634 | 623 |
| $T^{35kP}$ | 1047 | 1038 | 1046 | 1057 | 1050 | 1039 |
| $T^{breakdown}$ Zircon Breakdown Viscosity (P) | | | | | | |
| $T^{160kP}$ | 968 | 960 | 966 | 977 | 968 | 958 |
| Liquidus Temperature | | | | | 820 | 795 |
| Liquidus Viscosity (P) | | | | | $5.29 \times 10^6$ | $7.88 \times 10^6$ |
| Refractive Index | 1.5052 | 1.5057 | 1.5089 | 1.5046 | 1.5087 | 1.5079 |
| SOC | 3.424 | 3.425 | 3.344 | 3.369 | 3.41 | 3.434 |

| Sample | 43 | 44 | 45 | 46 | 47 | 48 | 49 |
|---|---|---|---|---|---|---|---|
| Softening Point | 778 | 762.4 | 772.3 | 759 | 766.8 | 763.5 | 767.7 |
| CTE | 28.41 | 28.8 | 28.3 | 30.5 | 28.6 | 30.04 | 28.08 |
| Strain Point | 521 | 517 | 518 | 516 | 513 | 511 | 516 |
| Anneal Point | 565 | 559 | 562 | 558 | 555 | 553 | 558 |
| $T^{200P}$ | 1476 | 1466 | 1475 | 1451 | 1467 | 1479 | 1443 |
| $10^{11}$ P Temperature | 638 | 629 | 635 | 628 | 626 | 624 | 629 |
| $T^{35kP}$ | 1062 | 1043 | 1061 | 1032 | 1048 | 1040 | 1039 |
| $T^{breakdown}$ | | | | | 1075 | | 1075 |
| Zircon Breakdown Viscosity (P) | | | | | 22121 | | 18989 |
| $T^{160kP}$ | 980 | 963 | 979 | 952 | 968 | 962 | 960 |
| Liquidus Temperature | 805 | | | | 1090 | | 770 |
| Liquidus Viscosity (P) | $1.12 \times 10^7$ | | | | $1.73 \times 10^4$ | | $2.15 \times 10^7$ |

TABLE 2-continued

Physical properties of the glasses listed in Table 1.

| Refractive Index | 1.5065 | 1.5064 | 1.5052 | 1.5086 | 1.5065 | 1.5069 | 1.5062 |
|---|---|---|---|---|---|---|---|
| SOC | 3.419 | 3.439 | 3.397 | 3.419 | 3.41 | 3.41 | 3.408 |

In some embodiments, the glasses described herein may be formed into a three dimensional shape using those means known in the art, including molding or the like. Non-limiting examples of such three dimensional shapes include those articles in which at least one surface has a dish-shaped, curved, convex, or concave profile. Dish-shaped articles may have a substantially flat portion bounded on at least one side by a curved portion. Non-limiting examples of dish-shaped glass ceramic articles are schematically shown in cross-sectional views in FIG. 2. Dish-shaped article 200 has two major surfaces 202, 204 each of which has a substantially flat or planar portion 210, bounded on either end (or, alternatively, on both ends) by a curved portion 220 to provide a dish-shaped profile or appearance. In other embodiments, dish-shaped article 230 has only one major surface 234 having a substantially flat or planar portion 210, bounded on either end (or, alternatively, on both ends) by a curved portion 220. The remaining major surface 232 is substantially flat or planar.

Ion exchange is widely used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. The compressive layer extends from the surface to a depth of layer (DOL) within the glass. In the glasses described herein, for example, potassium ions from the cation source are exchanged for sodium ions within the glass during ion exchange by immersing the glass in a molten salt bath comprising a potassium salt such as, but not limited to, potassium nitrate ($KNO_3$). Other potassium salts that may be used in the ion exchange process include, but are not limited to, potassium chloride (KCl), potassium sulfate ($K_2SO_4$), combinations thereof, and the like.

A cross-sectional schematic view of a planar ion exchanged glass article is shown in FIG. 3. Glass article 300 has a thickness t, first surface 310, and second surface 312. While the embodiment shown in FIG. 3 depicts glass article 300 as a flat planar sheet or plate, glass article may have other configurations, such as three dimensional shapes or non-planar configurations. Glass article 300 has a first compressive layer 320 extending from first surface 310 to a depth of layer $d_1$ into the bulk of the glass article 300. In the embodiment shown in FIG. 3, glass article 300 also has a second compressive layer 322 extending from second surface 312 to a second depth of layer $d_2$. Glass article also has a central region 330 that extends from $d_1$ to $d_2$. Central region 330 is under a tensile stress or central tension (CT), which balances or counteracts the compressive stresses of layers 320 and 322. The depth $d_1$, $d_2$ of first and second compressive layers 320, 322 protects the glass article 300 from the propagation of flaws introduced by sharp impact to first and second surfaces 310, 312 of glass article 300, while the compressive stress minimizes the likelihood of a flaw penetrating through the depth $d_1$, $d_2$ of first and second compressive layers 320, 322.

The glass articles described herein may be ion exchanged after being formed into a three dimensional shape. In non-limiting examples, the glass is annealed at the temperature defined by the $10^{13.2}$ poise viscosity of the glass and ion exchanged in a molten potassium nitrate bath for either four, eight, or 10 hours. The ion exchange bath may comprise nearly 100% $KNO_3$ by weight. In some embodiments, the ion exchange bath may comprise eat least about 95% $KNO_3$ by weight and, in other embodiments, at least about 92% $KNO_3$ by weight. The compressive layer comprises $K_2O$ and has a maximum compressive stress of at least about 700 MPa. In some embodiments, the compressive layer or layers (320, 322 in FIG. 3) may have a maximum compressive stress CS of at least about 700 MPa. In other embodiments the maximum compressive stress is at least about 800 MPa and, in still other embodiments, at least about 900 MPa. The depth of layer DOL ($d_1$, $d_2$ in FIG. 3) of each of compressive layers 320, 322 is, in some embodiments, at least 20 µm. In other embodiments, the depth of layer is at least about 30 µm.

Table 3 lists compressive stresses (CS), depths of layer (DOL), and Vickers crack indentation thresholds obtained by ion exchange of the glasses listed in Table 1. In a first set of ion exchange experiments, 1 mm thick samples were first annealed at the temperature defined by the $10^{13.2}$ poise viscosity of the glass and then ion exchanged at 410° C. in a $KNO_3$ bath for four hours. In a second set of experiments, 1 mm thick samples were first heated to the $10^{11}$ poise temperature and quenched to room temperature in order to simulate the thermal history produced in the fusion draw process. These quenched samples were then ion exchanged at 410° C. in a $KNO_3$ bath for four hours.

TABLE 3

Compressive stresses (CS), depths of layer (DOL), and Vickers crack indentation thresholds obtained by ion exchange of the glasses listed in Table 1.

| Sample | 1 | 2 | 3 | 4 | 5 | 6 |
|---|---|---|---|---|---|---|
| Annealed | | | | | | |
| CS (MPa) | 776 | 803 | 873 | 903 | 803 | 720 |
| DOL (µm) | 31 | 34 | 34 | 36 | 38 | 39 |
| Indentation threshold (kgf) | 30-40 | 30-40 | 20-30 | <10 | <10 | <10 |
| Heated at $10^{11}$ poise, quenched | | | | | | |
| CS (MPa) | 707 | 690 | 773 | 762 | 676 | 568 |
| DOL (µm) | 36 | 38 | 42 | 44 | 46 | 48 |
| Indentation threshold (kgf) | 30-40 | 30-40 | 20-30 | <10 | <10 | <10 |
| Sample | 7 | 8 | 9 | 10 | 11 | 12 |
| Annealed | | | | | | |
| CS (MPa) | 776 | 803 | 873 | 903 | 803 | 787 |
| DOL (µm) | 31 | 34 | 34 | 36 | 38 | 36 |
| Indentation threshold (kgf) | 30-40 | 30-40 | 20-30 | <10 | <10 | <10 |

TABLE 3-continued

Compressive stresses (CS), depths of layer (DOL), and Vickers crack indentation thresholds obtained by ion exchange of the glasses listed in Table 1.

| Heated at $10^{11}$ poise, quenched | | | | | | |
|---|---|---|---|---|---|---|
| CS (MPa) | 707 | 690 | 773 | 762 | 676 | 606 |
| DOL (μm) | 36 | 38 | 42 | 44 | 46 | 45 |
| Indentation threshold (kgf) | 30-40 | 30-40 | 20-30 | <10 | <10 | 10-20 |

| Sample | 13 | 14 | 15 | 16 | 17 | 18 |
|---|---|---|---|---|---|---|
| Annealed | | | | | | |
| CS (MPa) | | | 1045 | | | |
| DOL (μm) | | | 32 | | | |
| Indentation threshold (kgf) | | | <10 | | | |
| Heated at $10^{11}$ poise, quenched | | | | | | |
| CS (MPa) | 689 | 705 | 913 | 825 | 808 | 649 |
| DOL (μm) | 29 | 33 | 41 | 38 | 41 | 43 |
| Indentation threshold (kgf) | 20-30 | 20-30 | 10-20 | 20-30 | <10 | <10 |

| Sample | 19 | 20 | 21 | 22 | 23 | 24 |
|---|---|---|---|---|---|---|
| Annealed | | | | | | |
| Sample | 19 | 20 | 21 | 22 | 23 | 24 |
| CS (MPa) | 866 | 809 | 814 | 736 | 739 | 1010 |
| DOL (μm) | 38 | 40 | 41 | 44 | 44 | 34 |
| Indentation threshold (kgf) | <10 | <10 | 10-20 | <10 | <10 | <10 |
| Heated at $10^{11}$ poise, quenched | | | | | | |
| CS (MPa) | 744 | 693 | 666 | 602 | 620 | 843 |
| DOL (μm) | 46 | 47 | 49 | 50 | 54 | 43 |
| Indentation threshold (kgf) | <10 | <10 | 10-20 | <10 | <10 | <10 |

| Sample | 25 | 26 | 27 | 28 | 29 |
|---|---|---|---|---|---|
| Annealed | | | | | |
| CS (MPa) | 1034 | | 994 | 885 | 991 |
| DOL (μm) | 30 | | 25 | 46 | 36 |
| Indentation threshold (kgf) | <10 | <10 | 10-20 | <10 | 10-20 |
| Heated at $10^{11}$ poise, quenched | | | | | |
| CS (MPa) | 851 | 828 | 830 | 776 | 813 |
| DOL (μm) | 37 | 49 | 33 | 54 | 46 |
| Indentation threshold (kgf) | <10 | <10 | 10-20 | <10 | 10-20 |

In some embodiments, the glasses described herein comprise: at least about 50 mol % $SiO_2$ (i.e., $SiO_2$ >50 mol %); from about 10 mol % to about 20 mol % $Al_2O_3$ (i.e., 10 mol % < $Al_2O_3$ < 20 mol %); from about 1 mol % to about 8 mol % $P_2O_5$ (i.e., 1 mol % < $P_2O_5$ < 8 mol %); from about 2 mol % to about 10 mol % $B_2O_3$ (i.e., 2 mol % < $B_2O_3$ < 10 mol %); and from about 14 mol % to about 20 mol % $Na_2O$ (i.e., 14 mol % < $Na_2O$ < 20 mol %). The glass may further comprise from about 1 mol % to about 7 mol % ZnO (i.e., 1 mol % < ZnO < 7 mol %).

In some embodiments, $Al_2O_3$(mol %) > $P_2O_5$(mol %) + $B_2O_3$(mol %) and $Al_2O_3$(mol %) > $B_2O_3$(mol %) and, in some embodiments, $Na_2O$(mol %) > $Al_2O_3$(mol %). In some embodiments, $0.3 \leq [(R_2O(\text{mol \%}) + RO(\text{mol \%}) + B_2O_3(\text{mol \%}))]/[Al_2O_3(\text{mol \%}) + P_2O_5 (\text{mol \%}) + SiO_2 (\text{mol \%})] \leq 0.45$, where $R_2O$ are monovalent cation oxides and RO are divalent cation oxides. In some embodiments, the glass is substantially free of at least one of lithium, potassium, alkaline earth metals, and compounds thereof.

Each of the oxide components of the base and ion exchanged glasses described herein serves a function. Silica ($SiO_2$), for example, is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In some embodiments, the glasses described herein comprise at least about 50 mol % $SiO_2$, in other embodiments, from about 50 mol % to about 65 mol % $SiO_2$, and, in other embodiments, from about 50 mol % to about 60 mol % $SiO_2$.

In addition to silica, the glasses described herein comprise the network formers $Al_2O_3$ and $B_2O_3$ to achieve stable glass formation, low CTE, low Young's modulus, low shear modulus, and to facilitate melting and forming. Like $SiO_2$, $Al_2O_3$ contributes to the rigidity to the glass network. Alumina can exist in the glass in either fourfold or fivefold coordination. In some embodiments, the glasses described herein comprise from about 10 mol % to about 20 mol % $Al_2O_3$ and, in particular embodiments, from about 12 mol % to about 16 mol % mol % $Al_2O_3$.

Phosphorous pentoxide ($P_2O_5$) is a network former incorporated in these glasses. $P_2O_5$ adopts a quasi-tetrahedral structure in the glass network; i.e., it is coordinated with four oxygen atoms, but only three of which are connected to the rest of the network. The fourth oxygen is a terminal oxygen that is doubly bound to the phosphorous cation. Association of boron with phosphorus in the glass network can lead to a mutual stabilization of these network formers in tetrahedral configurations, as with $SiO_2$. Like $B_2O_3$, the incorporation of $P_2O_5$ in the glass network is highly effective at reducing Young's modulus and shear modulus. Incorporating $P_2O_5$ in the glass network also reduces the high temperature CTE, increases the ion-exchange interdiffusion rate, and improves glass compatibility with zircon refractory materials. In some embodiments, the glasses described herein comprise from about 1 mol % to about 8 mol % $P_2O_5$.

Boron oxide ($B_2O_3$) is also a glass-forming oxide that is used to reduce viscosity and thus improves the ability to melt and form glass. $B_2O_3$ can exist in either threefold or fourfold coordination in the glass network. Threefold coordinated $B_2O_3$ is the most effective oxide for reducing the Young's modulus and shear modulus, thus improving the intrinsic damage resistance of the glass. Accordingly, the glasses described herein, in some embodiments, comprises from about 2 mol % to about 10 mol % $B_2O_3$ and, in other embodiments, from about 5 mol % to about 8 mol % $B_2O_3$. The presence of both $B_2O_3$ and $P_2O_5$ in the glass enhances the mechanical performance of the glass by increasing the inherent damage resistance (IDR) of the glass. When ion exchanged, the glasses described herein exhibit Vickers indentation thresholds ranging from about 10 kgf to about 20 kgf.

The alkali oxide $Na_2O$ is used to achieve chemical strengthening of the glass by ion exchange. The glasses described herein include $Na_2O$, which can be exchanged for potassium in a salt bath containing, for example, $KNO_3$. In some embodiments, the glass comprises from about 14 mol % to about 20 mol % $Na_2O$ and, in other embodiments, from about 15 mol % to about 20 mol % $Na_2O$.

Like $B_2O_3$, the divalent oxide ZnO also improves the melting behavior of the glass by reducing the temperature at 200 poise viscosity (200P temperature). ZnO also is beneficial in improving the strain point when compared to like additions of $P_2O_5$, $B_2O_3$, and/or $Na_2O$. In some embodiments, the glasses described herein comprise from about 1 mol % up to about 7 mol % ZnO and, in other embodiments, from about 2 mol % to about 5 mol % ZnO.

Alkaline earth oxides, including MgO and CaO, may also be substituted for ZnO to achieve a similar effect on the 200P temperature and strain point. When compared to MgO and CaO, however, ZnO is less prone to promoting phase separation in the presence of $P_2O_5$. Other alkaline earth oxides, including SrO and BaO, may also be substituted for ZnO, but are less effective in reducing the melt temperature at 200 poise viscosity than ZnO, MgO, or CaO and are also less effective than ZnO, MgO, or CaO at increasing the strain point.

In some embodiments, the base glasses described herein are formable by down-draw processes that are known in the art, such as slot-draw and fusion-draw processes. The base glass compositions containing small concentrations of $Li_2O$ are fully compatible with the fusion-draw process and can be manufactured without issue. The lithium can be batched as either spodumene or lithium carbonate.

The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 100 kilopoise (kpoise), in other embodiments, at least about 120 kpoise, and in still other embodiments, these glasses have a liquidus viscosity of at least about 300 kpoise.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article, the glass article comprising from 50 mol % to 60 mol % $SiO_2$; at least about 8 mol % $Al_2O_3$; at least about 1 mol % $P_2O_5$; about 1 mol % to about 7 mol % ZnO; and at least 12 mol % $Na_2O$, wherein the glass article is substantially free from potassium,
the glass article is ion exchangeable and has a softening point of less than or equal to 825° C.,
a high temperature coefficient of thermal expansion of less than or equal to 30 ppm/° C., and
$Al_2O_3$(mol %)>$P_2O_5$(mol %)+$B_2O_3$(mol %).

2. An ion exchanged glass article, wherein the ion exchanged glass article is the glass article of claim 1 after being ion exchanged and has a compressive layer extending from a surface of the glass article to a depth of layer within the article, the compressive layer having a maximum compressive stress of at least 700 MPa.

3. The ion exchanged glass article of claim 2, wherein the maximum compressive stress is at least 800 MPa.

4. The ion exchanged glass article of claim 3, wherein the maximum compressive stress is at least 900 MPa.

5. The ion exchanged glass article of claim 2, wherein the depth of layer is at least 20 μm.

6. The ion exchanged glass article of claim 2, wherein the glass has a Vickers crack initiation threshold of at least 10 kgf.

7. The glass article of claim 1, wherein the glass article comprises: from 10 mol % to 20 mol % $Al_2O_3$; from about 1.45 mol % to 8 mol % $P_2O_5$; from 2 mol % to 10 mol % $B_2O_3$; and from about 14 mol % to about 20 mol % $Na_2O$.

8. The glass article of claim 7, wherein the glass article comprises from about 1 mol % to about 7 mol % ZnO.

9. The glass article of claim 7, wherein $Al_2O_3$(mol %)>$B_2O_3$(mol %), and $Na_2O$(mol %)>$Al_2O_3$(mol %).

10. The glass article of claim 7, wherein 0.3≤[($R_2O$(mol %)+RO(mol %) +$B_2O_3$(mol %)]/[($Al_2O_3$(mol %)+$P_2O_5$ (mol %)+$SiO_2$ (mol %)]≤0.45, where $R_2O$ are monovalent cation oxides and RO are divalent cation oxides.

11. The glass article of claim 1, wherein the glass article is substantially free of alkaline earth metals.

12. The glass article of claim 1, wherein the softening point is less than 800° C.

13. The glass article of claim 1, wherein the softening point is less than 775° C.

14. The glass article of claim 1, wherein the glass article has a non-planar shape.

15. The glass article of claim 1, wherein the glass article is down drawable.

16. The glass article of claim 1, wherein $SiO_2$ (mol %)+$Al_2O_3$(mol %)≤71.97 mol %.

17. An electronic product, comprising the glass article of claim 1.

18. An glass article, the glass article comprising at least about 50 mol % to 60 mol % $SiO_2$, at least 8 mol % $Al_2O_3$, at least 1 mol % $P_2O_5$, about 1 mol % to about 7 mol % ZnO, and at least 12 mol % $Na_2O$, wherein the glass article is substantially free of potassium prior to being ion exchanged,
wherein the glass article is ion exchanged and has a compressive layer extending from a surface of the glass article to a depth of layer within the article, the compressive layer having a maximum compressive stress of at least about 700 MPa,
wherein the glass has a softening point of less than or equal to about 825° C. and a high temperature coefficient of thermal expansion of less than or equal to 29 ppm/° C., and
wherein $Al_2O_3$(mol %)>$P_2O_5$(mol %)+$B_2O_3$(mol %).

19. The glass article of claim 18, wherein the maximum compressive stress is at least about 800 MPa.

20. The glass article of claim 19, wherein the maximum compressive stress is at least about 900 MPa.

21. The glass article of claim 18, wherein the depth of layer is at least 20 μm.

22. The glass article of claim 18, wherein the glass has a Vickers crack initiation threshold of at least about 10 kgf.

23. The glass article of claim 18, wherein the glass article comprises: from 10 mol % to 20 mol % $Al_2O_3$; from 1.45 to 8 mol % $P_2O_5$; from 2 mol % to 10 mol % to $B_2O_3$; and from 14 mol % to 20 mol % $Na_2O$.

24. The glass article of claim 23, wherein the glass article comprises from 1 mol % to 7 mol % ZnO.

25. The glass article of claim 23, wherein $Al_2O_3$(mol %)>$B_2O_3$(mol %), and $Na_2O$(mol %)>$Al_2O_3$(mol %).

26. The glass article of claim 23, wherein $0.3 \leq [(R_2O(\text{mol \%})+RO(\text{mol \%})+B_2O_3(\text{mol \%})]/[(Al_2O_3(\text{mol \%})+P_2O_5(\text{mol \%})+SiO_2(\text{mol \%})] \leq 0.45$, where $R_2O$ are monovalent cation oxides and RO are divalent cation oxides.

27. The glass article of claim 18, wherein the glass article is substantially free of at alkaline earth metals.

28. The glass article of claim 18, wherein the softening point is less than 800° C.

29. The glass article of claim 18, wherein the softening point is less than 775° C.

30. The glass article of claim 18, wherein the glass article has a nonplanar shape.

31. The glass article of claim 18, wherein the glass article is down drawable.

32. The glass article of claim 18, wherein $SiO_2$ (mol %)+$Al_2O_3$(mol %)≤71.97 mol %.

33. An electronic product, comprising the glass article of claim 18.

* * * * *

UNITED STATES PATENT AND TRADEMARK OFFICE
CERTIFICATE OF CORRECTION

PATENT NO. : 9,975,803 B2
APPLICATION NO. : 14/629966
DATED : May 22, 2018
INVENTOR(S) : Timothy Michael Gross It is certified that error appears in the above-identified patent and that said Letters Patent is hereby corrected as shown below:

On the Title Page

In Column 1, item (56), other publications, Line 1, delete "Mathamatics," and insert -- Mathematics, --, therefor.

In the Claims

In Column 17, Line 65, Claim 1, delete "at least about 8" and insert -- at least 8 --, therefor.

In Column 17, Lines 65-66, Claim 1, delete "at least about 1" and insert -- at least 1 --, therefor.

In Column 18, Line 1, Claim 1, delete "free from" and insert -- free of --, therefor.

In Column 18, Line 23, Claim 7, delete "free about" and insert -- from --, therefor.

In Column 18, Line 25, Claim 7, delete "from about 14 mol % to about 20 mol %" and insert -- from 14 mol % to 20 mol % --, therefor.

In Column 18, Line 27, Claim 8, delete "1 mol % to about 7 mol %" and insert -- 1 mol % to 7 mol % --, therefor.

In Column 18, Line 30, Claim 10, delete "[($R_2O$" and insert -- [$R_2O$ --, therefor.

In Column 18, Line 31, Claim 10, delete "[($Al_2O_3$" and insert -- [$Al_2O_3$ --, therefor.

In Column 18, Line 48, Claim 18, delete "An glass" and insert -- A glass --, therefor.

In Column 18, Lines 48-49, Claim 18, delete "at least about" and insert -- from --, therefor.

In Column 18, Line 58, Claim 18, delete "at least about" and insert -- at least --, therefor.

Signed and Sealed this
Twenty-eighth Day of July, 2020

Andrei Iancu
*Director of the United States Patent and Trademark Office*

CERTIFICATE OF CORRECTION (continued)
U.S. Pat. No. 9,975,803 B2

In Column 18, Line 60, Claim 18, delete "equal to about" and insert -- equal to --, therefor.

In Column 18, Line 65, Claim 19, delete "at least about" and insert -- at least --, therefor.

In Column 18, Line 67, Claim 20, delete "at least about" and insert -- at least --, therefor.

In Column 19, Line 4, Claim 22, delete "at least about" and insert -- at least --, therefor.

In Column 19, Line 6, Claim 23, delete "1.45 to" and insert -- 1.45 mol % to --, therefor.

In Column 19, Line 7, Claim 23, delete "10 mol % to $B_2O_3$;" and insert -- 10 mol % $B_2O_3$; --, therefor.

In Column 19, Line 13, Claim 26, delete "[($R_2O$" and insert -- [$R_2O$ --, therefor.

In Column 19, Line 14, Claim 26, delete "[($Al_2O_3$" and insert -- [$Al_2O_3$ --, therefor.

In Column 19, Line 18, Claim 27, delete "free of at alkaline" and insert -- free of alkaline --, therefor.